Patented July 24, 1928.

1,677,994

UNITED STATES PATENT OFFICE.

ALBERT L. STILLMAN, OF PLAINFIELD, NEW JERSEY, ASSIGNOR TO THE GENERAL FUEL BRIQUETTE CORPORATION, OF NEW YORK, N. Y., A CORPORATION OF NEW YORK.

BRIQUETTE AND PROCESS OF MAKING THE SAME.

No Drawing.   Application filed January 21, 1927. Serial No. 162,682.

This invention relates to the manufacture of briquettes and particularly to fuel briquettes in which fuel, as for example coal fines in a fine powdered condition, is agglomerated by the use of a suitable binder or binders and formed into compact briquettes by a pressing operation followed by heat treatment.

In the manufacture of fuel briquettes it is desirable that the briquettes when finished will not be only hard, durable, smokeless and water-insoluble, but also that they will have a low absorptive capacity for water.

The principal object of this invention is to provide a new and improved process by means of which briquettes having the desired characteristics, above set forth, may be produced and at a comparatively low cost.

Innumerable binders have been heretofore suggested for fuel briquettes, including among the more common varieties, molasses sugar, starch, oils, tars, pitch, and waste sulphite liquor from paper mills, and mixtures of these substances in various proportions. Such materials either alone, or in combination, when used as binders for briquettes and subsequently exposed to the customary carbonizing temperature of 600° to 800° F. will form a carbon residue having what may be described as a somewhat porous structure which develops an absorptive power for water on the part of the briquette.

As fuel briquettes are transported in open cars and stored in open places and are generally exposed to moist atmospheres and conditions, the briquettes take up and retain absorbed moisture, with the result that they become weakened structurally, tend to break during the rough handling to which such products are subjected, have reduced calorific power, retard ignition and combustion, and have a tendency to disintegrate in a fire with attendant bad effects, and have other objectionable characteristics.

I have discovered that if, instead of using such binders as molasses, or sugar, or syrups containing appreciable amounts of sugar, I employ residues of fermentation processes which contain no appreciable amounts of sugar, for instance less than 10%, combine such liquors with sulphite liquor, as a binder for fuel briquettes, such binder after carbonization of the briquette at the usual temperatures for a short time, say 20 minutes, will form a dense, hard, carbonaceous residue with a minimum of cells and consequently a low absorptive power for water on the part of the briquette. It will be apparent that molasses, or black strap mollases, is not the substance of the kind or character which this invention contemplates, but that molasses and black strap molasses are substances of the kind which will defeat the objects of the present invention. Black strap molasses is the syrup remaining when sugar is crystalized from cane juice, contains 40% sugar, and has a saccharine character. When, however, such black strap molasses is treated for the extraction of its fermentable sugar, as in alcohol making processes, there remains a substance known as molasses lees, which is a sour residue, containing less than 10% sugar, is not classifiable as a saccharine substance and moreover has an acid reaction.

It is this type of substance, to wit, molasses lees as distinguished from black strap molasses, which lies at the foundation of the present invention. When such molasses lees are introduced into a mixer, preferably of the edge runner type, to which simultaneously powdered coal, and sulphite liquor are also added in suitable proportions, a binder will be developed in the briquette made from the mixed materials, which, after the customary heat treatment, will have the desired dense, hard, carbonaceous residue-structure.

A specific method of carrying out my improved process will now be set forth: I mix about 10% of the molasses lees and sulphite liquor (i. e. a pectin containing material with an acid reaction such as is obtained as waste liquor from the sulphite process of paper making evaporated to contain 40 to 60% of solids) with about 90% powdered or comminuted coal (preferably of a distinctly bituminous character) in any suitable mixing device (preferably of the edge runner type). The mixture, after suitable treatment in the mixer, is fed to a briquetting press and therein subjected to pressure to agglomerate or compact it and to form it into lumps or briquettes of the desired shape and size. After the pressing operation the briquettes are subjected to a temperature of from 600° to 800° F. for a period of about 20 minutes.

A suitable mixture for the binding substance is from 50 to 70% of molasses lees with from 50 to 30% of sulphite liquor both of 32° Bé. I am not able to state the exact nature of the reaction which occurs when the molasses lees is mixed with the sulphite liquor, but as I secure a similar result with other sulphur materials or sulphur containing liquors, such as sulphuric acid, I have concluded that an effect akin to polymerization or vulcanization is possibly produced by the admixture of the sulphite liquor with the molasses lees in the presence of the coal.

I am aware that it has been proposed to use a mixture of black strap molasses and sulphite liquor as a binder for the manufacture of briquettes, but for the reasons heretofore set forth, the use of molasses lees in accordance with my invention is quite distinct. Black strap molasses possesses a stickiness due to its high sugar content and when admixed with the sulphite liquor; the latter is used because of its sticky, viscous properties, and these two substances when used together are ordinarily mixed together before being added to the fuel. According to my process the best results are obtained by introducing the binding materials and the fuel separately and simultaneously to the mixer, rather than mixing the binding materials and then adding them as a mixture to the fuel. It seems that when molasses lees are mixed with sulphite liquor before sending the mix to the comminuted coal, an opportunity is afforded for the acid in the sulphite liquor to precipitate solids or heavy colloids out of the molasses lees, which tend to clog the pipes through which the mixed binder material is fed to the mixing equipment. When, on the other hand, the molasses lees and the sulphite liquor are sent through separate pipes, a different type of action takes place. Theoretically it appears probable that the acid in the sulphite liquor in this last case acts not upon the molasses lees but upon the inorganic or ash content of the coal. Accordingly it seems probable that the resultant tremendous strength of the binding carbon in the finished carbonized briquette is due to the fact that inorganic compounds, such as calcium sulphate, has been formed by the interaction referred to and these compounds in turn take their place as a part of the binder. The presence of such compounds in the final binding charcoal would of course add great strength to the briquette. At any rate it is a fact that when the two binding elements are separately fed to the coal in the masticator a materially stronger and better briquette will be produced than when the binder materials are mixed in advance of their addition to the comminuted coal.

Due to the high sugar content of the black strap molasses the briquettes produced by its use contain a substantial amount of water of crystallization which is absent when molasses lees is employed so that in the latter case there will be heat economy in the final baking treatment and the product will obviously be less porous as there are no substantial quantities of sugar carbon residues nor any such porous condition as results from driving off water of crystallization.

Various changes in the specific form shown and described may be made within the scope of the claims without departing from the spirit of the invention.

I claim:

1. The method of making briquettes which comprises bringing together approximately 90% of powdered carboniferous fuel and approximately 5% to 7% molasses lees and from 5% to 3% of sulphite liquor, grinding, crushing, and kneading the thus assembled mixture until an intensely interacted moldable agglomerate is formed, shaping the agglomerated mixture into briquettes under pressure and then subjecting the briquettes to a carbonizing temperature.

2. The method of making briquettes which comprises bringing together approximately 90% of powdered carboniferous fuel and approximately 5% to 7% molasses lees and from 5% to 3% of sulphite liquor, the three said substances being separately fed to a common mass, mixing the said substances as they meet in said mass, grinding, crushing and kneading the thus assembled mixture until an intensely interacted moldable agglomerate is formed, shaping the agglomerated mixture into briquettes under pressure and then subjecting the briquettes to a carbonizing temperature in the neighborhood of 600° to 800° F.

3. A briquette comprising as its major component comminuted coal, and as its minor component a binder for said coal composed of the residues which result from baking, at a binder-carbonizing temperature, a briquette formed by bringing together approximately 90% of powdered carboniferous fuel and approximately 5% to 7% molasses lees and from 5% to 3% of sulphite liquor, grinding, crushing and kneading the thus assembled mixture until an intensely interacted moldable agglomerate is formed, the agglomerated mixture being then briquetted under pressure.

4. A briquette comprising as its major component comminuted coal, and as its minor component a binder for said coal composed of the residues which result from baking, at a temperature in the neighborhood of 600° to 800° F., a briquette formed by bringing together approximately 90% of powdered carboniferous fuel and approximately 5% to 7% molasses lees and from 5% to 3% of sulphite liquor, the three said substances being separately fed to a common mass, mixing the said substances as they meet in said mass, grinding, crushing and kneading the thus assembled mixture until an intensely interacted moldable agglomerate is formed, the agglomerated mixture being then briquetted.

In testimony whereof I have hereunto set my hand.

ALBERT L. STILLMAN.